US007199984B2

(12) United States Patent
Carey et al.

(10) Patent No.: US 7,199,984 B2
(45) Date of Patent: Apr. 3, 2007

(54) CURRENT-PERPENDICULAR-TO-PLANE MAGNETORESISTIVE SENSOR WITH FREE LAYER STABILIZED BY IN-STACK ORTHOGONAL MAGNETIC COUPLING

(75) Inventors: Matthew J. Carey, San Jose, CA (US);
Jeffrey R. Childress, San Jose, CA (US); Bruce A. Gurney, San Rafael, CA (US); Stefan Maat, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 435 days.

(21) Appl. No.: 10/802,639

(22) Filed: Mar. 16, 2004

(65) Prior Publication Data

US 2005/0207070 A1   Sep. 22, 2005

(51) Int. Cl.
*G11B 5/39* (2006.01)
*G11B 5/33* (2006.01)
*G11B 5/127* (2006.01)

(52) U.S. Cl. .............................. 360/324.12; 360/324.2

(58) Field of Classification Search ............. 360/324.2, 360/324.11, 324.12, 324.1
See application file for complete search history.

(56) References Cited

U.S. PATENT DOCUMENTS

| 5,465,185 | A  |    | 11/1995 | Heim et al. |           |
|-----------|----|----|---------|-------------|-----------|
| 6,023,395 | A  |    | 2/2000  | Dill et al. |           |
| 6,473,279 | B2 |    | 10/2002 | Smith et al.|           |
| 6,704,175 | B2 |    | 3/2004  | Li et al.   |           |
| 6,710,984 | B1 | *  | 3/2004  | Yuasa et al.| 360/324.11|
| 6,714,388 | B2 | *  | 3/2004  | Hasegawa et al. | 360/324.11 |
| 7,023,670 | B2 | *  | 4/2006  | Saito       | 360/324.12|
| 2003/0017364 | A1 |  | 1/2003  | Kikitsu et al. |        |
| 2005/0207073 | A1 | * | 9/2005  | Carey et al.| 360/324.12|
| 2006/0044707 | A1 | * | 3/2006  | Araki et al.| 360/324.12|
| 2006/0103991 | A1 | * | 5/2006  | Hoshino et al. | 360/324.12 |

OTHER PUBLICATIONS

Tanaka et al., "Spin-valve heads in the current-perpendicular-to-plane mode for ultrahigh-density recording", IEEE Transactions on Magnetics, 38 (1): 84-88 Part 1 Jan. 2002.
Maat et al., "90° coupling induced by exchange blasting in PtMn/CoFe10/CoFe2O4/CoFe10 films", J. Appl. Phys. vol. 93, pp. 7229-7231 (2003).
Slonczewski, "Overview of interlayer exchange theory", Journal of Magnetism and Magnetic Materials, 150 (1995) 13-24.

* cited by examiner

*Primary Examiner*—William J Klimowicz
(74) *Attorney, Agent, or Firm*—Thomas R. Berthold

(57) ABSTRACT

A magnetically-coupled structure has two ferromagnetic layers with their in-plane magnetization directions coupled orthogonally across an electrically-conducting spacer layer that induces the direct orthogonal magnetic coupling. The structure has application for in-stack biasing in a current-perpendicular-to-the-plane (CPP) magnetoresistive sensor. One of the ferromagnetic layers of the structure is a biasing ferromagnetic layer and the other ferromagnetic layer is the sensor free layer. An antiferromagnetic layer exchange-couples the biasing layer to fix its moment parallel to the moment of the sensor pinned layer. This allows a single annealing step to be used to set the magnetization direction of the biasing and pinned layers. The electrically-conducting spacer layer, the biasing layer and the antiferromagnetic layer that exchange-couples the biasing layer may all extend beyond the edges of the sensor stack.

36 Claims, 6 Drawing Sheets ly through the layers depends on the relative orientation of the magnetizations in the two ferromagnetic layers. While in a MTJ magnetoresistive read head the spacer layer is electrically insulating and is typically alumina ($Al_2O_3$), in a CPP-SV magnetoresistive read head the spacer layer is electrically conductive and is typically copper.

For maximum read-head stability and response-linearity without hysteresis in all CIP-SV, CPP-SV and MTJ read heads, the magnetization of the free layer should be maintained in a saturated single domain state in the absence of an external magnetic field. In such a state, the local magnetization everywhere in the free layer, including the ends or side edges, is essentially "longitudinal", i.e., along the length of the free layer and the cross-track direction of the head and parallel to the plane of the magnetic recording medium. Ferromagnetic biasing layers are typically used to achieve longitudinal biasing of the free layer. U.S. Pat. No. 6,023,395 describes an MTJ magnetoresistive read head that has a biasing ferromagnetic layer located in the sensor stack and magnetostatically coupled across A spacer layer with the free layer. U.S. Pat. No. 6,473,279 also describes CPP sensors with longitudinal biasing layers located in the sensor stack.

One limitation with in-stack biasing in CPP magnetoresistive sensors is that all of the layers making up the biasing structure, i.e., the biasing layer, a spacer layer, and an antiferromagnetic layer if the biasing layer is to be exchange-coupled, must be electrically conductive and add very little resistance to the sensor stack. Also, the requirement of a second antiferromagnetic layer in the sensor to exchange-couple the biasing layer requires a second annealing step in the presence of an applied field to set the magnetization direction of the biasing layer since the magnetization directions of the biasing layer and the pinned layer are orthogonal.

What is needed is a CPP magnetoresistive sensor with improved in-stack biasing of the sensor free layer.

SUMMARY OF THE INVENTION

The invention is a magnetically-coupled structure with two ferromagnetic layers having their in-plane magnetization directions coupled orthogonally across an electrically-conducting spacer layer that induces the direct orthogonal magnetic coupling.

The structure has application for in-stack biasing in a CPP magnetoresistive sensor, in which case one of the ferromagnetic layers of the magnetically-coupled structure is a biasing ferromagnetic layer and the other ferromagnetic layer is the sensor free layer. An antiferromagnetic layer is used to exchange-couple the biasing layer to fix its the moment parallel to the moment of the sensor pinned layer. Because the moments of the biasing and pinned layers in the sensor are parallel, a single annealing step is used to set the magnetization direction of the biasing and pinned layers. This allows the same antiferromagnetic material to be used for both the antiferromagnetic layer that exchange-couples the biasing layer and the antiferromagnetic layer that exchange-couples the pinned layer. Because the orthogonal magnetic coupling of the free layer magnetization is by direct coupling through the electrically conducting spacer layer, the spacer layer, the biasing layer and the antiferromagnetic layer that exchange-couples the biasing layer may all extend beyond the edges of the sensor stack, thereby reducing the parasitic electrical resistance of the sensor.

The electrically-conducting spacer layer that serves as the magnetically-coupling layer in the structure can be an XMn alloy, where X is Pt, Ni, Fe, Ir, Pd or Rh; elemental Cr or Mn; a rare-earth transition-metal alloy, such as TbFe, ThCo, GdFe and GdCo; or a nonmagnetic transition metal, such as Cu, Ru, Ir, Rh and Os. Preferably the magnetically-coupling layer is PtMn having a thickness between approximately 15 and 50 Å.

For a fuller understanding of the nature and advantages of the present invention, reference should be made to the following detailed description taken together with the accompanying figures.

DETAILED DESCRIPTION OF THE INVENTION

Prior Art

Figure 1:
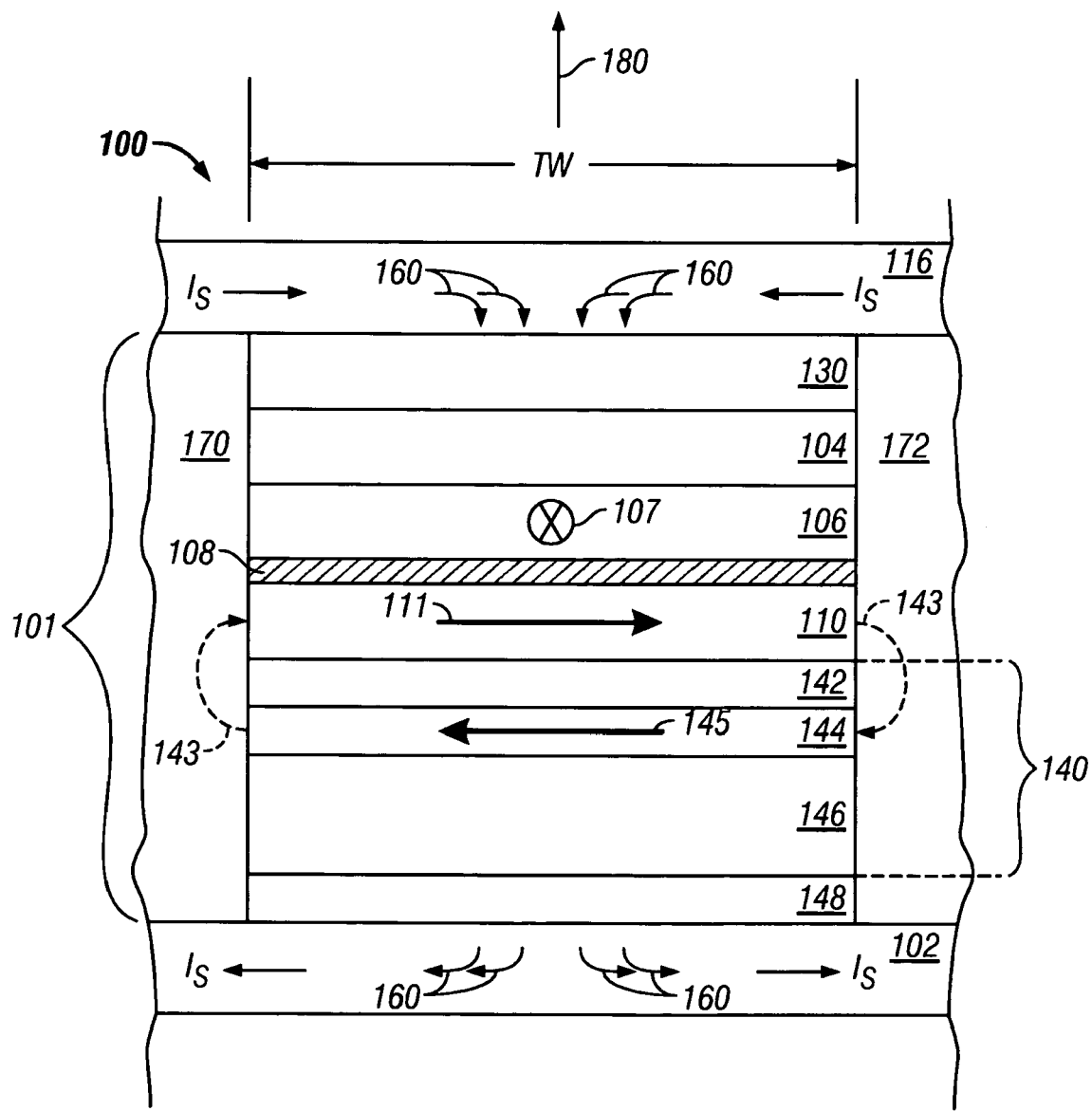
FIG. 1 is a cross-sectional view a conventional prior art CPP sensor.

FIG. 1 is a sectional view of a prior art current-perpendicular-to-the-plane (CPP) sensor 100 with in-stack biasing and depicted as a disk drive magnetoresistive read head as it would appear when viewed from the disk. Sensor 100 comprises a stack 101 of layers formed on a substrate 102, which in the case of a read head is the bottom magnetic shield that also serves as the bottom electrical lead. A top magnetic shield 116 on stack 101 also serves as the top electrical lead. The sensor stack 101 is located in the gap between the generally planar surfaces of shields 102, 116. The gap material 170, 172 on the sides of the sensor stack 101 is an insulating material, typically an oxide such as alumina ($Al_2O_3$). Sense current Is flows perpendicularly through the layers in the stack 101 between the two leads/shields 116, 102, as shown by arrows 160. The width of the data tracks that can be resolved on the disk is determined by the trackwidth (TW) of the sensor stack 101. The shielding geometry provided by shields 102, 116 attenuates the flux coming from adjacent magnetic transitions of the recorded data along the downtrack direction 180 (perpendicular to the layers in the stack) and therefore enhances the sensor's linear resolution.

The layers in sensor stack 101 include a pinned ferromagnetic layer 106 having a fixed magnetic moment or magnetization direction 107 oriented transversely (into the page), a free ferromagnetic layer 110 having a magnetic moment or magnetization direction 111 that can rotate in the plane of layer 110 in response to transverse external magnetic fields, and a nonmagnetic spacer layer 108 between the pinned layer 106 and free layer 110. The pinned layer 106 is exchange-coupled with an antiferromagnetic layer 104. Thus the magnetization direction 107 of pinned layer 106 is fixed and will not rotate in the presence of an external magnetic field in the range of interest, i.e., magnetic fields from recorded data. For a CPP-spin-valve (CPP-SV) sensor, the spacer layer 108 is electrically conductive, and is typically formed of copper. For a MTJ sensor, the spacer layer 108 is an electrically insulating tunnel barrier layer, and is typically alumina ($Al_2O_3$). A capping layer 130 typically formed of Ta or Ru may be formed on top of the antiferromagnetic layer 104.

The sensor stack 101 also includes a longitudinal bias stack 140. The bias stack 140 includes a biasing ferromagnetic layer 144 that has an in-plane magnetic moment 145 and is separated from the free layer 110 by a nonmagnetic electrically conductive spacer layer 142. An antiferromagnetic layer 146 is formed on a suitable underlayer 148 on substrate 102 and provides antiferromagnetic exchange-coupling to the biasing layer 144 to assure that its moment 145 will not rotate in the presence of an external magnetic field in the range of interest.

The biasing layer 144 provides a longitudinal biasing magnetic field to stabilize the magnetization of the free layer 110 longitudinally in the direction 111 along the length of the free layer. The self-field or demagnetizing field from the biasing layer 144 magnetostatically couples with the edges of the free layer 110, as shown by the dashed arrows 143, to stabilize the magnetic moment of the free layer 110 and linearize the output of the sensor. The electrically conductive spacer layer 142 minimizes direct exchange coupling between the biasing layer 144 and the free layer 110 and allows sense current Is to flow perpendicularly through the layers in the stack between the two leads 116, 102, as shown by arrows 160. Because the longitudinal biasing of free layer 110 is accomplished by magnetostatic edge coupling with biasing layer 144 across spacer layer 142, as shown by the dashed arrows 143, the biasing layer 144 and spacer layer 142 can not extend beyond the TW but must have edges substantially contiguous with the edges of the free layer 110.

The electrical leads/magnetic shields 102, 116 are typically formed of permalloy (NiFe) or sendust (FeAlSi). The pinned layer 106, free layer 110 and biasing layer 144 are typically formed of an alloy of one or more of Co, Fe and Ni, or a bilayer of two alloys, such as a CoFe—NiFe bilayer. As an alternative to the exchange-coupled biasing layer 144, the biasing layer may be a "hard" or relatively high coercivity ferromagnet, such as CoPt or CoCrPt, in which case antiferromagnetic layer 146 is not required. The antiferromagnetic layers 104, 146 are typically formed of a sufficiently thick Mn alloy layer (PtMn, NiMn, FeMn, IrMn, PdMn, PtPdMn or RhMn). A PtMn layer needs to be thicker than approximately 100 Å to become chemically-ordered and antiferromagnetic when annealed, and an IrMn layer is antiferromagnetic as deposited when it is thicker than approximately 40 Å. These antiferromagnetic Mn alloys may also include small amounts of additional elements, such as Cr, V, Pt, Pd and Ni that are typically added to improve corrosion resistance or increase electrical resistance.

The sensor is fabricated in the conventional manner, using deposition, lithographic processing, ion milling, reactive-ion-etching and other fabrication techniques well-known for conventional SV and MTJ sensors. Because the magnetization direction 107 of pinned layer 106 is orthogonal to the magnetization direction 145 of biasing layer 144, the antiferromagnetic layers 104, 146 must either be made of different materials or of the same material with different thickness to ensure that antiferromagnetic layers 104, 146 have different blocking temperatures. In the latter case the thinner of the two layers will have the lower blocking temperature. Typically antiferromagnetic layer 104 will have a blocking temperature $T_{BH}$ higher than the blocking temperature $T_{BL}$ of antiferromagnetic layer 146. The blocking temperature of a magnetic material is the temperature at which the net magnetic moment no longer has a fixed orientation. In the case of a ferromagnetic/antiferromagnetic bilayer, such as bilayers 106/104 and 140/146, the blocking temperature is the temperature at which the exchange bias field between the two layers in the bilayer vanishes.

Two annealing steps are required to set the two orthogonal magnetization directions 107, 145. During or after fabrication of the sensor 100, the temperature is raised to above $T_{BH}$ and the sensor is exposed to an externally applied magnetic field in the direction 107 to set the magnetization direction of pinned layer 106. After the temperature is decreased to below $T_{BH}$ and the externally applied magnetic field is removed the pinned layer 106 has its magnetization fixed in the direction 107 by being exchange-coupled to antiferromagnetic layer 104. Next the temperature is raised to above $T_{BL}$ but below $T_{BH}$ and the sensor is exposed to an externally applied magnetic field in the direction 145 to set the magnetization direction of biasing layer 144. After the temperature is decreased to below $T_{BL}$ and the externally applied magnetic field is removed the biasing layer 144 has its magnetization fixed in the direction 145 by being exchange-coupled to antiferromagnetic layer 146.

The Invention

Figure 2:
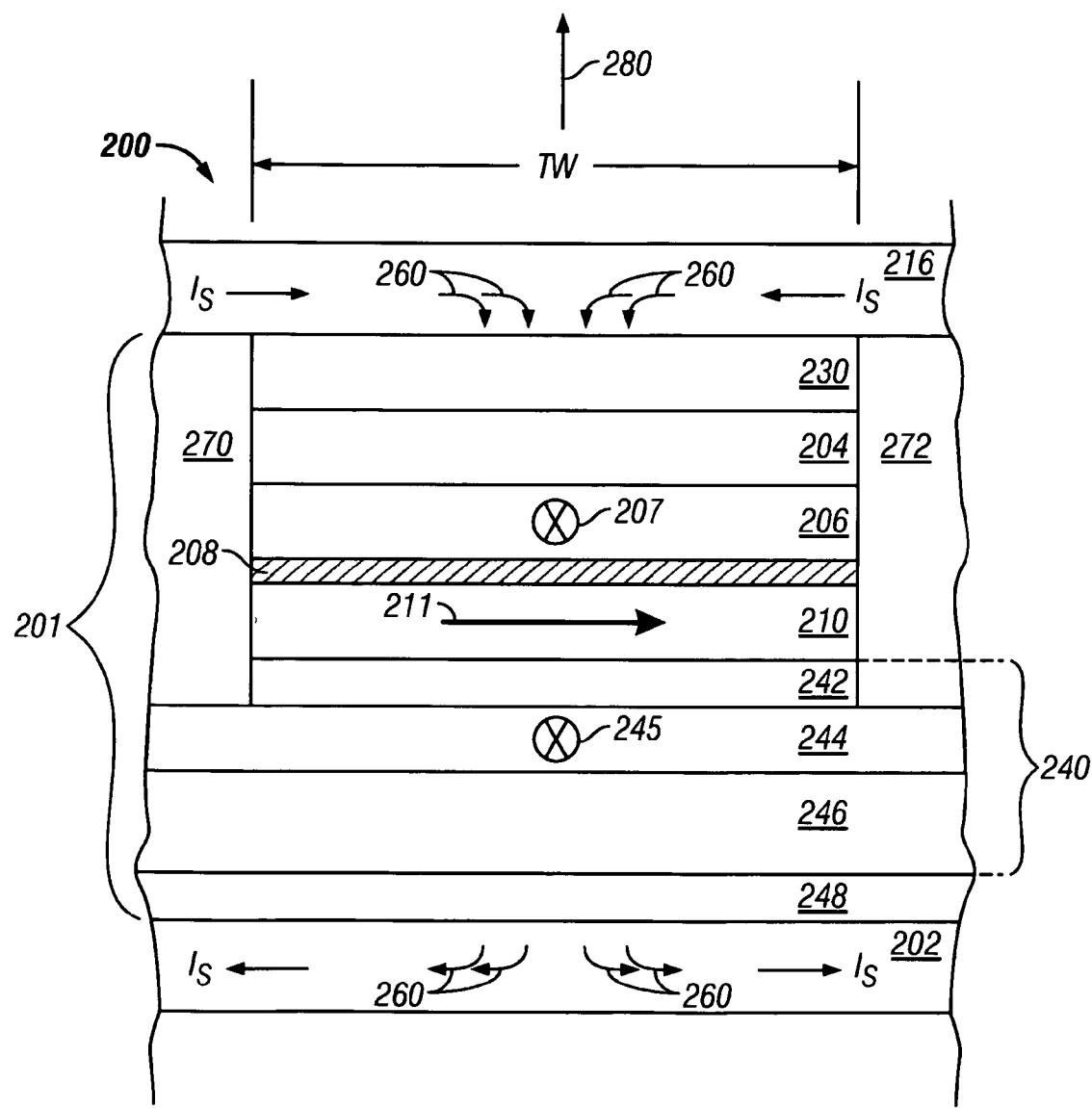
FIG. 2 is a cross-sectional view of the CPP sensor of the present invention.

FIG. 2 is a sectional view of the CPP sensor 200 of the present invention. It is substantially identical structurally to the prior art CPP sensor 100, with the primary exception of a longitudinal bias stack 240 in place of stack 140.

The bias stack 240 includes a biasing ferromagnetic layer 244 that has an in-plane magnetic moment or magnetization direction 245 that is substantially orthogonal to the moment 211 of free layer 210 in the absence of an external magnetic field and substantially parallel to the moment 207 of pinned layer 206. As used herein "substantially orthogonal" means that the two moments or magnetization directions are closer to orthogonal than parallel. An antiferromagnetic layer 246 is formed on a suitable underlayer 248 on substrate 202 and provides antiferromagnetic exchange-coupling to the biasing layer 244 to assure that its moment 245 will not rotate in the presence of an external magnetic field in the range of interest of the sensor. The magnetization direction 211 of free layer 210, in the absence of an external magnetic field, is caused to be orthogonal to the magnetization direction 245 of biasing layer 244 by direct orthogonal magnetic coupling induced by electrically-conducting spacer layer 242 that acts as a magnetically-coupling layer.

Because the longitudinal biasing of free layer 210 is by direct magnetic coupling from biasing layer 244 through spacer layer 242, rather than by magnetostatic coupling at the edges of the free and biasing layers, the biasing layer 244 and antiferromagnetic layer 246 do not need to be part of the sensor stack 201 but can extend beyond the TW of the sensor 200. This reduces the parasitic resistance of the sensor because the area of the biasing layer 244, antiferromagnetic layer 246 and underlayer 248 through which the sense current flows is much greater than it would be if these layers had the same dimension as the trackwidth TW. While the embodiment shown in FIG. 2 has the spacer layer 242 with the TW dimension, the spacer layer 242 may optionally also be unpatterned and thus extend beyond the TW dimension. The layers 242, 244, 246, and 248 do not need to extend beyond the trackwidth TW, but can be patterned to the TW dimension, but this would result in a higher sensor resistance.

Because the magnetization direction 207 of pinned layer 206 is parallel to the magnetization direction 245 of biasing layer 244, the magnetization directions 207, 245 can be set in a single annealing step. This allows the antiferromagnetic layers 204, 246 to be made of the same material. The easy axes of the biasing layer 244 and the free layer 210 initially are parallel to the magnetic field applied during deposition, i.e., parallel to the directions 207, 245. However, after annealing, the biasing layer 244 becomes exchange-biased with the antiferromagnetic layer 246 and the free layer 210 exhibits a 90-degree rotated easy axis, orthogonal to the annealing direction.

The orthogonal magnetic coupling layer of free layer 210 to biasing layer 244 is induced by the electrically-conducting spacer layer 242 that acts as a magnetically-coupling layer. The spacer layer 242 is preferably a generally equi-atomic $Pt_{50}Mn_{50}$ layer having a thickness less than approximately 100 Å, preferably between approximately 15 Å and 50 Å. This thickness is well below the thickness at which $Pt_{50}Mn_{50}$ exhibits its antiferromagnetic exchange bias effect, which is typically at a thickness greater than approximately 100 Å.

Orthogonal magnetic coupling has been observed between two $Co_{90}Fe_{10}$ layers, in which the first $Co_{90}Fe_{10}$ layer is exchange-biased to a PtMn antiferromagnetic layer and the two $Co_{90}Fe_{10}$ layers are separated by a thin cobalt-ferrite ($CoFe_2O_4$) layer. S. Maat and B. Gurney, "90° coupling induced by exchange biasing in PtMn/CoFe$_{10}$/CoFe$_2$O$_4$/CoFe$_{10}$ films", J. AppL. Phys., Vol. 93, pp. 7229–7231 (2003). However, because cobalt-ferrite is an electrical insulator, structures incorporating it are generally not usable in CPP sensors.

Figure 3:
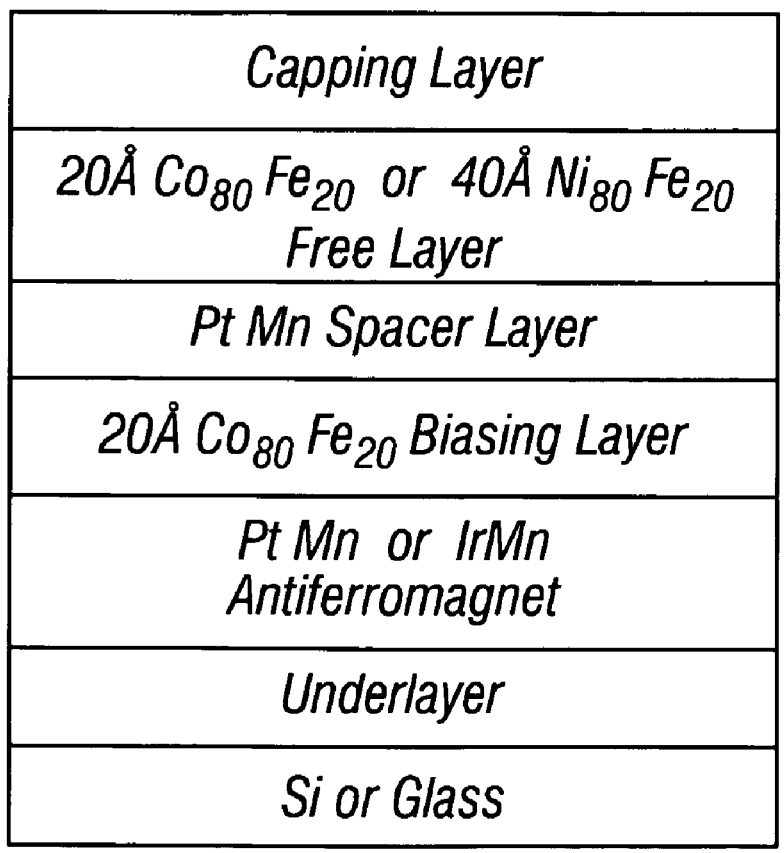
FIG. 3 is a sectional view of the test structures used to demonstrate the orthogonal magnetically-coupled structures of the present invention.

The effect of direct orthogonal magnetic coupling in the present invention was demonstrated in test structures for various PtMn spacer layer thicknesses. FIG. 3 is a sectional view of the test structures. For these structures the magnetic coupling was very close to 90 degrees. Preferably the magnetic coupling induced by the spacer layer should be approximately orthogonal, e.g., between approximately 80 and 100 degrees. For structures with PtMn as the antiferromagnetic layer exchange-coupled to the biasing layer, the underlayer was a 30 Å Ta layer, and for the IrMn antiferromagnetic layer, the underlayer was a bilayer of 30 Å Ta/20 Å Cu. The capping layer was a bilayer of 30 Å Ru/80 Å Ta.

Figure 4:
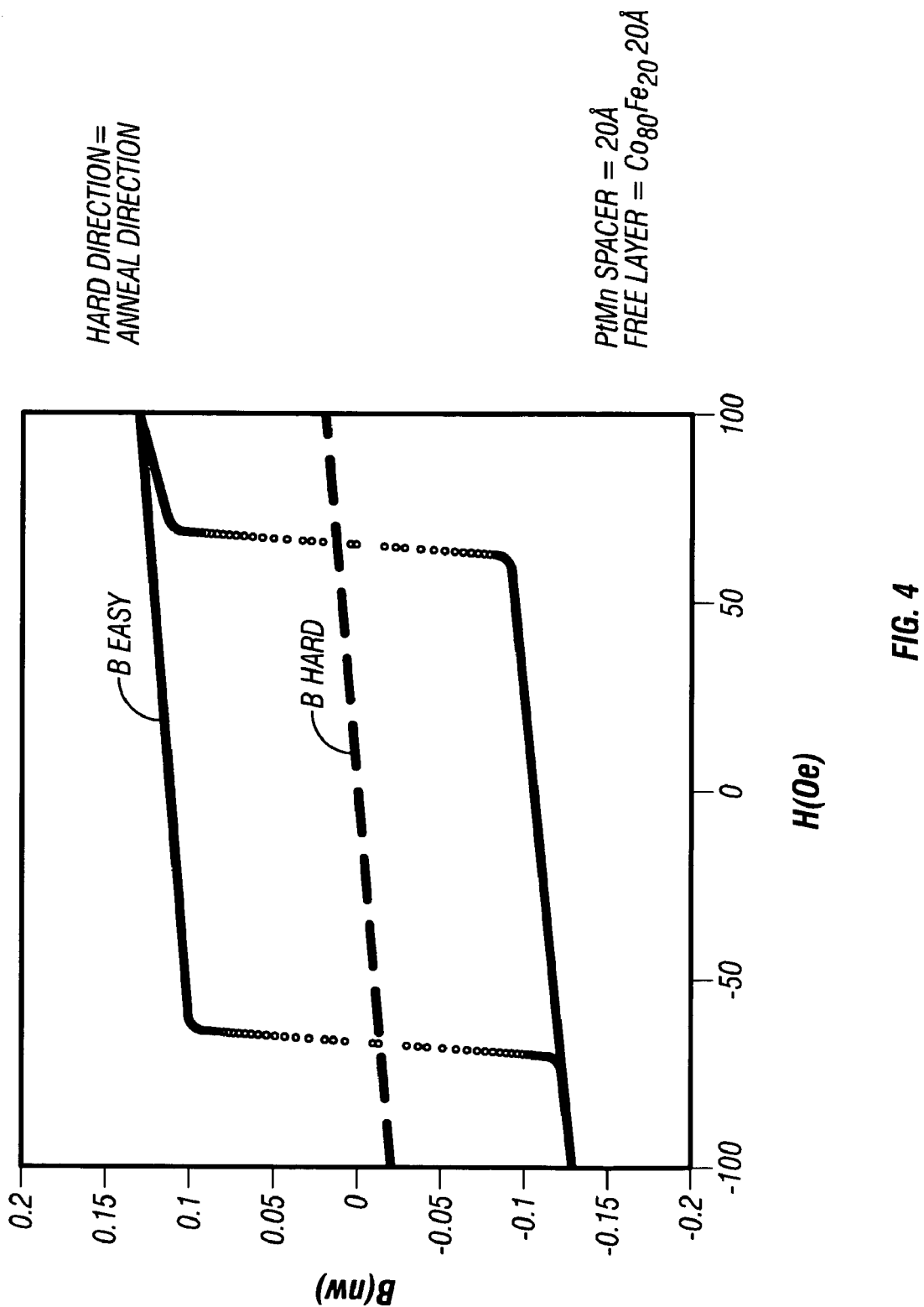
FIG. 4 is a B-H loop for a 20 Å $Co_{80}Fe_{20}$ free layer in a test structure with a 20 Å PtMn magnetically-coupling layer and a $Co_{80}Fe_{20}$ biasing layer exchange-coupled to a PtMn antiferromagnet.

FIG. 4 is a B-H loop for a 20 Å $Co_{80}Fe_{20}$ free layer in a test structure with a 20 Å PtMn spacer layer and the 20 Å $Co_{80}Fe_{20}$ biasing layer exchange-coupled to a PtMn antiferromagnet. The solid line is the B-H loop along the easy axis (the preferred axis of the free layer moment in zero field), which in this case is orthogonal to the direction of the applied field during annealing. The anneal direction is parallel to the direction of magnetization of the biasing layer. The dashed line is the B-H curve along the anneal direction. FIG. 3 thus shows that the free layer preferred or easy axis has arranged itself orthogonal to the direction of magnetization of the biasing layer.

Figure 5:
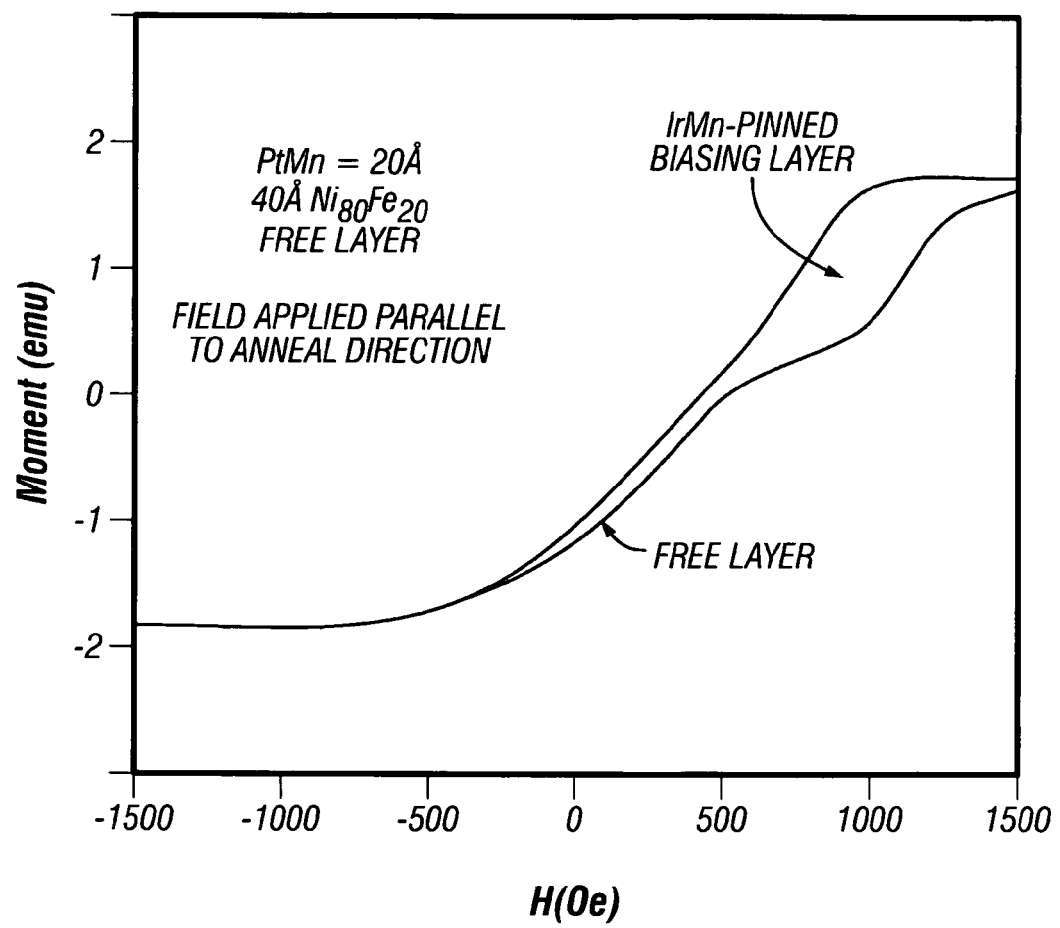
FIG. 5 is a M-H loop for a test structure with a 40 Å $Ni_{80}Fe_{20}$ free layer, a 20 Å PtMn magnetically-coupling layer and a $Co_{80}Fe_{20}$ biasing layer exchange-coupled to a IrMn antiferromagnet.

FIG. 5 is a M-H loop for a test structure with a 40 Å $Ni_{80}Fe_{20}$ free layer, a 20 Å PtMn spacer layer and the 20 Å $Co_{80}Fe_{20}$ biasing layer exchange-coupled to an IrMn antiferromagnet. The field was applied parallel to the anneal direction (orthogonal to the easy axis of the 40 Å $Ni_{80}Fe_{20}$ free layer). The loop at high fields (to the right of FIG. 4) shows the behavior of the IrMn-pinned biasing layer. The behavior of the free layer is shown near zero field. It can be seen that in this region there is a large slope, indicating a closed loop or hard-axis loop. The lack of a square M-H loop near zero field shows that the easy axis of the free layer is orthogonal to the anneal direction, which is the direction of the moment of the biasing layer. For this structure, $H_k$, the field at which the free layer saturates along the hard axis, was 340 Oe.

Figure 6:
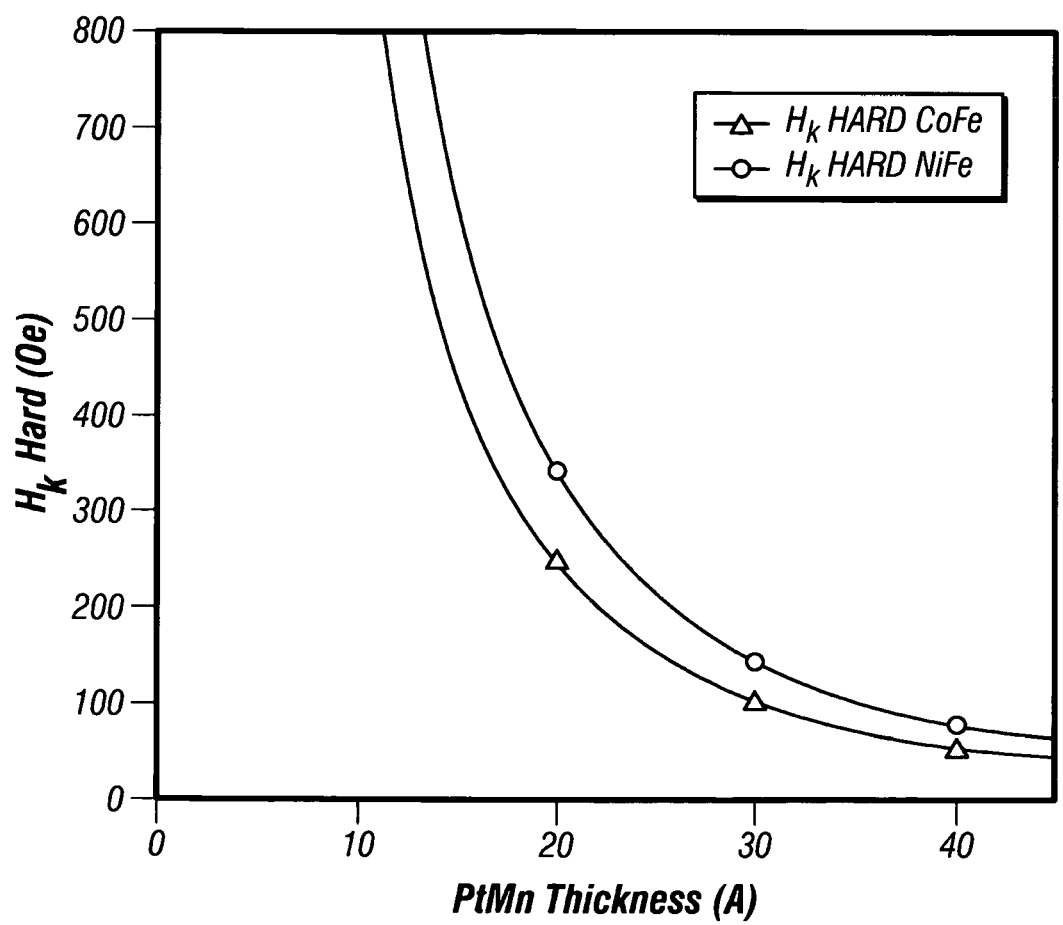
FIG. 6 is a graph of anisotropy field $H_k$ of the free layers in the test structures as a function of PtMn magnetically-coupling layer thickness.

FIG. 6 is a graph of anisotropy field $H_k$ of the free layers in the test structures as a function of PtMn spacer layer thickness. A high $H_k$ is desirable to assure that the free layer response is a linear function of the applied field. Typical fields from the recorded media are less than approximately 150 Oe, and conventional magnetoresistive heads have free layers with Hk of only approximately 40 Oe or less, but the biasing field from the contiguous junction hard bias layer or in-stack bias layer creates a unidirectional anisotropy field of similar magnitude (200–400 Oe). FIG. 5 shows that free layers with orthogonal bias can achieve $H_k$ higher than approximately 300 Oe for PtMn spacer layer thicknesses of approximately 20 Å and $H_k$ higher than approximately 400 Oe for PtMn spacer layer thicknesses of approximately 15 Å.

The PtMn spacer layer in the above test structures was generally equiatomic $Pt_{50}Mn_{50}$. However, because its thickness is less than the thickness required to generate an exchange biasing effect, the PtMn spacer layer may have a relatively wide composition range, for example Pt may be between approximately 25 and 75 atomic percent.

To obtain orthogonal coupling between the biasing layer and the free layer the biasing layer should have a fixed magnetization direction in low externally applied magnetic fields as it is created through exchange biasing with an antiferromagnet. Alternatively, a hard magnet with high remanence may be used as the biasing layer since its magnetization will also be fixed in externally applied magnetic fields lower than its coercive field.

The electrically-conducting magnetically-coupling spacer layer needs to exhibit some degree of antiferromagnetic interactions to invoke orthogonal coupling in the second ferromagnetic layer due to interfacial spin-frustration. Accordingly the spacer layer can be an antiferromagnetic or ferrimagnetic material. However the spacer layer should be below the critical thickness where it exhibits exchange-bias interaction with the adjacent ferromagnetic layers. The orthogonal coupling then is a result of energy minimization. Thus the materials described below are also believed suitable for use as the electrically-conducting spacer layer.

Other Mn alloys may be suitable for use as the spacer layer providing orthogonal magnetic coupling provided they have thicknesses below which they exhibit the effect of antiferromagnetic exchange-biasing. These other Mn alloys include NiMn, FeMn, IrMn, PdMn, PtPdMn and RhMn. These Mn alloys may also include small amounts of additional elements, such as Cr, V, Pt, Pd and Ni that are typically added to improve corrosion resistance or increase electrical resistance.

Elementary Cr or Mn may also be suitable for use as the spacer layer. Thin layers of either element do not exhibit exchange-bias interaction with an adjacent ferromagnetic layer although they exhibit antiferromagnetic order.

Certain electrically-conducting ferrimagnetic materials, such as the rare-earth transition-metal alloys, may also be suitable for use as the spacer layer. These include TbFe, ThCo, GdFe and GdCo.

In addition to the above materials for the magnetically-coupling spacer layer, all of which exhibit antiferromagnetic interactions, certain non-magnetic transition metals that induce an electron-mediated indirect exchange coupling (RKKY coupling) may also be suitable because the exchange interaction can oscillate between antiferromagnetic and ferromagnetic values as a function of the spacer thickness. Therefore if the microstructure of the layers was made such that the local thickness of the spacer layer is rapidly fluctuating, both antiferromagnetic and ferromagnetic values may coexist on a scale smaller than the ferromagnetic domain wall width. This case is magnetically similar to an antiferromagnetic spacer and will therefore also induce frustration leading to orthogonal coupling of the ferromagnetic layers. These non-magnetic spacer materials include Cu, Ru, Ir, Rh, and Os. See J. C. Slonczewski, "Overview of interlayer exchange theory", *Journal of Magnetism and Magnetic Materials*, 150 (1995) 13–24.

In the embodiment described above and in the test structures the biasing ferromagnetic layer was exchange biased to an antiferromagnetic layer. However, as described above, the biasing ferromagnetic layer may also be a hard ferromagnet, such as CoPt or CoCrPt, in which case an antiferromagnetic layer would not be required.

While the structure shown in FIG. 2 has the pinned ferromagnetic layer 206 above the free layer 210, these layers could be reversed, in which case the stack 240 would be located between the free layer 210 and the capping layer 230 with the order of the layers in stack 240 also being reversed, i.e., magnetic-coupling spacer layer 242 would be located on top of the free layer 210, the biasing layer 244 on top of spacer layer 242 and antiferromagnetic layer 246 on top of biasing layer 244 and beneath capping layer 230.

Also, the pinned layer 206 can be the well-known anti-parallel-pinned (AP-pinned) structure, also called a "laminated" pinned layer, as described in U.S. Pat. No. 5,465,185. This structure minimizes magnetostatic coupling of the pinned layer 206 with the free layer 210. The AP-pinned structure comprises a ferromagnetic pinned layer, a non-magnetic spacer layer and a ferromagnetic reference layer.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetically-coupled structure in a magnetic device of the type having a substrate and a plurality of ferromagnetic layers, the structure being formed on the substrate and comprising:
   a first ferromagnetic layer having an in-plane magnetization direction oriented in a first direction, the first ferromagnetic layer comprising a hard ferromagnet having its magnetization direction substantially prevented from rotation in the presence of an applied magnetic field;
   a second ferromagnetic layer magnetically-coupled to the first ferromagnetic layer and having an in-plane magnetization direction oriented substantially orthogonal to said first direction in the absence of an applied magnetic field; and
   an electrically-conducting spacer layer between the first and second ferromagnetic layers, the spacer layer inducing substantial orthogonal magnetic coupling of the second ferromagnetic layer to the first ferromagnetic layer.

2. The structure of claim 1 wherein the spacer layer is an alloy comprising X and Mn, wherein X is selected from the group consisting of Pt, Ni, Fe, Ir, Pd and Rh.

3. The structure of claim 2 wherein the XMn alloy includes one or more elements selected from the group consisting of Cr, V, Pt, Pd and Ni.

4. The structure of claim 2 wherein the spacer layer is a PtMn alloy having a thickness less than approximately 100 Angstroms.

5. The structure of claim 4 wherein the PtMn alloy has a thickness between approximately 15 and 50 Angstroms.

6. The structure of claim 4 wherein the PtMn alloy comprises a PtMn alloy with Pt between approximately 25 and 75 atomic percent.

7. The structure of claim 1 wherein the spacer layer consists essentially of Cr or Mn.

8. The structure of claim 1 wherein the spacer layer consists essentially of a rare-earth transition-metal alloy selected from the group consisting of TbFe, TbCo, GdFe and GdCo.

9. The structure of claim 1 wherein the spacer layer consists essentially of a transition-metal alloy selected from the group consisting of Cu, Ru, Rh, Ir and Os.

10. The structure of claim 1 wherein the device is a current-perpendicular-to-the-plane magnetoresistive sensor and wherein the second ferromagnetic layer is the sensor free layer whose magnetization direction is free to rotate in the presence of an applied magnetic field, the magnetization of the free layer being stabilized across the spacer layer by the first ferromagnetic layer.

11. A magnetoresistive sensor capable of sensing external magnetic fields when a sense current is applied perpendicular to the planes of the layers in the sensor, the sensor comprising:
a substrate;
a free ferromagnetic layer having an in-plane magnetization direction oriented substantially in a first direction in the absence of an external magnetic field, said free layer magnetization direction being substantially free to rotate in the presence of an external magnetic field;
a pinned ferromagnetic layer having an in-plane magnetization direction oriented in a second direction substantially orthogonal to said first direction;
a first antiferromagnetic layer exchange-coupled to the pinned layer and preventing substantial rotation of the magnetization direction of the pinned layer in the presence of an external magnetic field in the range of interest;
a nonmagnetic spacer layer between the free and pinned layers;
a ferromagnetic biasing layer magnetically-coupled to the free layer and having an in-plane magnetization direction oriented substantially orthogonal to said first direction in the absence of an external magnetic field; and
an electrically-conducting spacer layer between the biasing and free layers, the spacer layer between the biasing and free layers exhibiting no antiferromagnetic exchange-biasing effect and inducing substantial orthogonal magnetic coupling of the free layer to the biasing layer.

12. The sensor of claim 11 further comprising a second antiferromagnetic layer exchange-coupled with the biasing layer for substantially preventing rotation of the magnetization direction of the biasing layer in the presence of an external magnetic field in the range of interest.

13. The sensor of claim 11 wherein the biasing layer is a hard ferromagnet having a magnetization direction substantially prevented from rotation in the presence of an external magnetic field in the range of interest.

14. The sensor of claim 11 wherein the nonmagnetic spacer layer is electrically conducting.

15. The sensor of claim 11 wherein the sensor is a magnetic tunnel junction and wherein the nonmagnetic spacer layer is an electrically-insulating tunnel barrier.

16. The sensor of claim 11 wherein the pinned layer is located between the substrate and the free layer and the free layer is located between the pinned layer and the biasing layer.

17. The sensor of claim 11 wherein the pinned layer is an antiparallel-pinned layer.

18. The sensor of claim 11 wherein the sensor is a magnetoresistive read head for reading magnetically recorded data from tracks on a magnetic recording medium, wherein the substrate is a first shield formed of magnetically permeable material and having a substantially horizontal planar surface, wherein the free and pinned layers and nonmagnetic spacer layer have substantially vertical side walls defining a sensor trackwidth less than the width of the first shield, and wherein the biasing layer is on the substrate beneath the free layer and extends beyond the sensor trackwidth.

19. The sensor of claim 18 wherein the electrically-conducting spacer layer between the biasing and free layers is on the biasing layer and extends beyond the sensor trackwidth.

20. The sensor of claim 11 wherein the spacer layer between the biasing and free layers is an alloy comprising X and Mn, wherein X is selected from the group consisting of Pt, Ni, Fe, Ir, Pd and Rh.

21. The sensor of claim 20 wherein the spacer layer between the biasing and free layers is a PtMn alloy having a thickness less than approximately 100 Angstroms.

22. The sensor of claim 21 wherein the PtMn alloy comprises a PtMn alloy with Pt between approximately 25 and 75 atomic percent.

23. The sensor of claim 11 wherein the spacer layer between the biasing and free layers consists essentially of Cr or Mn.

24. The sensor of claim 11 wherein the spacer layer between the biasing and free layers consists essentially of a rare-earth transition-metal alloy selected from the group consisting of TbFe, TbCo, GdFe and GdCo.

25. The sensor of claim 11 wherein the spacer layer between the biasing and free layers consists essentially of a transition-metal alloy selected from the group consisting of Cu, Ru, Rh, Ir and Os.

26. A current-perpendicular-to-the-plane magnetoresistive read head for reading magnetically recorded data from tracks on a magnetic recording medium, the head comprising:
a first shield of magnetically permeable material and having a substantially horizontal planar surface;
a ferromagnetic biasing layer on the first shield and having an in-plane magnetization direction oriented in a fixed direction in the absence of a magnetic field from the medium;
an electrically-conducting magnetically-coupling layer on the biasing layer, the magnetically-coupling layer exhibiting no antiferromagnetic exchange-biasing effect and comprising an alloy comprising X and Mn, wherein X is selected from the group consisting of Pt, Ni, Fe, Ir, Pd and Rh;
a free ferromagnetic layer on the magnetically-coupling layer and magnetically-coupled across the magnetically-coupling layer to the biasing layer, the free layer having an in-plane magnetization direction oriented approximately orthogonal to the fixed magnetization direction of the biasing layer in the absence of a magnetic field from the medium and substantially free to rotate in the presence of a magnetic field from the medium;
a nonmagnetic spacer layer on the free layer;
a pinned ferromagnetic layer having an in-plane magnetization direction parallel to the fixed magnetization direction of the biasing layer;
an antiferromagnetic layer exchange-coupled to the pinned layer and preventing substantial rotation of the magnetization direction of the pinned layer in the presence of a magnetic field from the medium; and
wherein the free and pinned layers and nonmagnetic spacer layer have substantially vertical side walls defining a sensor trackwidth less than the width of the first shield, and wherein the biasing layer extends beyond the sensor trackwidth.

27. The head of claim 26 wherein the magnetically-coupling layer extends beyond the sensor trackwidth.

28. The head of claim 26 further comprising an antiferromagnetic layer between the first shield and the biasing layer and exchange-coupled with the biasing layer for substantially preventing rotation of the magnetization direction of the biasing layer in the presence of a magnetic field from the medium, the antiferromagnetic layer exchange-coupled to the biasing layer extending beyond the sensor trackwidth.

29. The head of claim 28 wherein the antiferromagnetic layer exchange-coupled to the biasing layer is formed of a material selected from the group consisting of PtMn, NiMn, FeMn, IrMn, PdMn, PdPtMn and RhMn.

30. The head of claim 26 wherein the head is a spin-valve head and the nonmagnetic spacer layer is electrically-conducting.

31. The head of claim 26 wherein the head is a magnetic tunnel junction head and wherein the nonmagnetic spacer layer is a tunnel barrier.

32. The head of claim 26 wherein the XMn alloy includes one or more elements selected from the group consisting of Cr, V, Pt, Pd and Ni.

33. The head of claim 26 wherein the magnetically-coupling layer is an alloy comprising Pt and Mn and having a thickness less than approximately 100 Angstroms.

34. The head of claim 33 wherein the PtMn alloy has a thickness between approximately 15 and 50 Angstroms.

35. The head of claim 33 wherein the PtMn comprises a PtMn alloy with Pt between approximately 25 and 75 atomic percent.

36. A magnetically-coupled structure in a magnetic device of the type having a substrate and a plurality of ferromagnetic layers, the structure being formed on the substrate and comprising:

a first ferromagnetic layer having an in-plane magnetization direction oriented in a first direction;

a second ferromagnetic layer magnetically-coupled to the first ferromagnetic layer and having an in-plane magnetization direction oriented substantially orthogonal to said first direction in the absence of an applied magnetic field; and an electrically-conducting spacer layer between the first and second ferromagnetic layers, the spacer layer inducing substantial orthogonal magnetic coupling of the second ferromagnetic layer to the first ferromagnetic layer, the spacer layer comprising a PtMn alloy with Pt between approximately 25 and 75 atomic percent and having a thickness between approximately 15 and 50 Angstroms.

* * * * *